United States Patent
Harvey

(10) Patent No.: US 8,732,486 B1
(45) Date of Patent: *May 20, 2014

(54) METHOD AND SYSTEM FOR SUPPLEMENTING CURRENT DURING ENUMERATION OF A USB DEVICE

(75) Inventor: Timothy J. Harvey, Temecula, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 754 days.

This patent is subject to a terminal disclaimer.

(21) Appl. No.: 12/039,624

(22) Filed: Feb. 28, 2008

Related U.S. Application Data

(63) Continuation of application No. 10/230,184, filed on Aug. 27, 2002, now Pat. No. 7,340,627.

(51) Int. Cl.
*G06F 1/26* (2006.01)

(52) U.S. Cl.
USPC .......................................................... 713/300

(58) Field of Classification Search
USPC .......................................................... 713/300
See application file for complete search history.

(56) References Cited

U.S. PATENT DOCUMENTS

| | | | |
|---|---|---|---|
| 5,598,089 | A | 1/1997 | Shintomi |
| 5,987,617 | A | 11/1999 | Hu et al. |
| 6,087,811 | A | 7/2000 | Crawford et al. |
| 6,157,179 | A | 12/2000 | Miermans |
| 6,455,953 | B1 | 9/2002 | Lam |
| 6,526,515 | B1 | 2/2003 | Charles et al. |
| 6,665,801 | B1 | 12/2003 | Weiss |
| 6,715,071 | B2 * | 3/2004 | Ono et al. ................. 713/100 |
| 6,847,197 | B2 | 1/2005 | Susak et al. |
| 6,859,069 | B2 | 2/2005 | Ajit |
| 6,946,817 | B2 | 9/2005 | Fischer et al. |

OTHER PUBLICATIONS

USPTO Final Rejection for U.S. Appl. No. 10/230,184 dated May 10, 2007; 11 pages.
USPTO Non Final Rejection for U.S. Appl. No. 10/230,184 dated Nov. 3, 2006; 9 pages.
USPTO Notice of Allowance for U.S. Appl. No. 10/230,184 dated Oct. 4, 2007; 7 pages.
USPTO Final Rejection for U.S. Appl. No. 10/230,184 dated Jun. 19, 2006; 11 pages.
USPTO Final Rejection for U.S. Appl. No. 10/230,184 dated Oct. 27, 2005; 9 pages.
USPTO Non Final Rejection for U.S. Appl. No. 10/230,184 dated Mar. 6, 2006; 8 pages.
USPTO Non Final Rejection for U.S. Appl. No. 10/230,184 dated May 11, 2005; 7 pages.

\* cited by examiner

*Primary Examiner* — Kim Huynh
*Assistant Examiner* — Eric Chang

(57) ABSTRACT

A method and device for supplementing current from the USB bus for enumerating USB devices that require additional current beyond that allowable by USB bus specification is disclosed. A chargeable power source, such as a capacitor or rechargeable battery, is supplied to the enumeration circuitry and is charged from the USB bus for an initial period of time. The charged power source is then discharged to supplement the allowable current available for enumeration during a second period of time. It is during this second period of time that the enumeration takes place. The circuitry may exist in the USB device or may be supplied separately as a power monitor or power maintenance chip or device.

19 Claims, 5 Drawing Sheets

METHOD AND SYSTEM FOR SUPPLEMENTING CURRENT DURING ENUMERATION OF A USB DEVICE

RELATED APPLICATIONS

The present application is a continuation of and claims the benefit of U.S. patent application Ser. No. 10/230,184, filed Aug. 27, 2002, now U.S. Pat. No. 7,340,627, issued Mar. 4, 2008. That application is incorporated herein by reference in its entirety and for all purposes.

BACKGROUND OF THE INVENTION

Devices that connect to a host computer by means of a USB bus may be referred to as USB devices. A USB device may be a printer, a scanner, a hard disk, a digital camera, a CD burner, etc., or any device configured to connect to a host system or device via a USB bus. Enumeration is the bus related process by which a USB device is attached to a system and is assigned a specific numerical address that will be used to access that particular device. It is also the time at which the USB host controller queries the device in order to decide what type of device it is in order to attempt to assign to it an appropriate driver. This process is a fundamental step for every USB device because, without it, the device would never be able to be used by the operating system.

Until recently there were two classifications of USB devices, low speed devices and full speed devices. During the initial enumeration process, during which it identifies itself to the host and obtains an address, the device draws current from the V-bus line of the USB bus. A USB specification states that this current should not exceed 100 mA during enumeration. The low speed and full speed devices have had no trouble meeting the 100 mA specification. Once the initialization of the enumeration process is complete, the USB device may request to draw up to 500 mA, and may do so once the host has granted permission.

Recent USB devices have been manufactured that operate at higher speeds (High-Speed USB) than the full speed devices and, as a result, they may draw current in excess of 100 mA during the initial process of enumeration. Manufacturers of high speed USB devices are finding it difficult to manufacture such a device that runs at less than 100 mA during the initial enumeration process. The consequence is that many manufacturers are having problems getting USB certification for their products or are producing products that are draining excess battery power from laptop computers or other wireless host devices in violation of the USB specification 2.0.

SUMMARY OF THE INVENTION

Accordingly, it would be desirable to have a method or device for enumerating a high speed USB device while meeting the USB specification for drawing no more than 100 mA from the USB bus during the initial enumeration process.

According to embodiments of the present invention, USB enumeration architecture is provided herein that is compatible with the power specifications for a USB while able to enumerate high speed USB devices needing power in excess of the USB specifications.

In various embodiments, a Universal Serial Bus (USB) device enumeration architecture is described herein comprising a USB bus for supplying a current during the USB device enumeration, a current mixer coupled to the bus, and a chargeable power source coupled to the USB bus. The USB bus is configured to charge the chargeable power source during a first time interval. Then, the chargeable power source is configured to discharge a current during a second time interval, the discharged current being mixed with the current from the USB bus for enumerating a USB device. In this fashion, the present invention allows the USB device to consume more power than the USB specification calls for during enumeration with the excess coming from the chargeable source. In this embodiment, the second time interval corresponds to the enumeration phase.

In one embodiment, a USB device architecture is described that further comprises a current regulator coupled to the USB bus for regulating current supplied to the USB device from a host device. A state machine implemented control circuit may also be used.

A USB device architecture is described, according to one embodiment, including control logic for switching from charging to discharging the chargeable power source following the first time interval. In one embodiment, a USB device architecture is described wherein the control logic comprises a timer for determining the first time interval. A USB device architecture is described, in accordance with one embodiment, further comprising a resistor for connecting the chargeable power source to the current mixer and the architecture to the USB device.

In one embodiment a method for enumerating a USB device is also described wherein a chargeable power source is provided and coupled to a USB bus. The power source is charged during a first time interval with current from the USB bus and the power source is discharged during a second time interval. The resultant discharge current augments the current from the USB bus, thus providing sufficient current for enumerating a high speed USB device.

The present embodiments provide the above advantages and others not specifically mentioned above but described in the sections to follow. Other features and advantages of the embodiments will become apparent from the following detailed description, taken in conjunction with the accompanying drawings, illustrating by way of example the principles of the embodiments.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

In the following detailed description of the embodiments, numerous specific details are set forth in order to provide a thorough understanding of the present invention. However, it will be recognized by one skilled in the art that the present invention may be practiced without some specific details or with equivalents thereof. In other instances, well-known methods, procedures, components, and circuits have not been described in detail as not to unnecessarily obscure aspects of the embodiments.

In accordance with the embodiments, a USB device enumeration architecture is designed using a chargeable power source for augmenting USB bus current for enumerating a USB device. The USB device enumeration architecture includes a chargeable power source that may be charged from the USB bus current during a first time interval and, subsequently, discharged to augment the USB bus current during a second time interval while the USB device is being enumerated. This allows high speed USB devices to be enumerated without exceeding the design specifications for USB busses that specify the current draw from the USB bus during enumeration remain at or below a low limit (e.g., 100 mA).

Figure 1A:
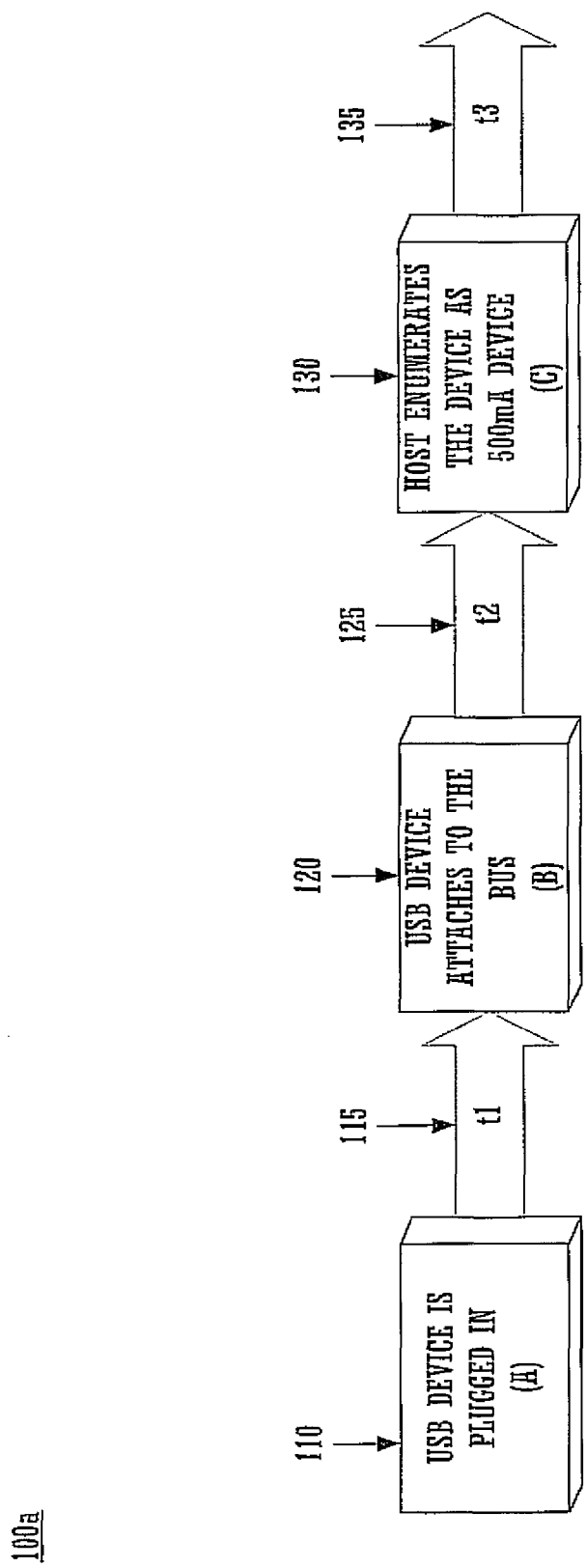
FIG. 1A is a block diagram of an overview of a timeline for the steps in enumerating a USB device in accordance with one embodiment of the present invention.

FIG. 1A is a flow diagram 100a of an overview of a timeline for the steps in enumerating a USB device according to one aspect of the embodiments. In block 110, a USB device is plugged into a USB port, e.g., of a hub or host computing device, like a laptop computer. The USB device may be a low speed, full speed or high speed device. It may be any of a variety of devices configured to attach to a host computing device (e.g., a computer) by means of a USB port.

Block 115 of diagram 100a represents a first time interval, t1, during which a chargeable power source, such as a capacitor or a battery, is charging from current supplied by a v-bus within the USB bus in accordance with an aspect of the embodiments. Time, t1, may vary depending on design parameters, but might be expected to be of a duration of approximately 100 milliseconds (ms). During time t1, the USB device is not logically attached to the USB bus. According to one embodiment, the charge built up at the chargeable power source may be determined at the end of a predetermined time period (e.g., 100 ms) and if not sufficient for the device to be enumerated, an extension period to time t1 (e.g., 100 ms) may be granted. This may be repeated. The chargeable power source may then continue to charge until a sufficient charge is accumulated for enumerating the device.

Still referring to FIG. 1A, block 120 illustrates the USB device logically attaching to the USB bus according to one embodiment. At this point, the chargeable power source is sufficiently charged and the enumeration architecture is set to discharge the power source. At block 120 the USB device pulls up a D+ data line from the USB bus, initializing the enumeration process.

Block 125 of FIG. 1A represents a second time interval, t2, according to one embodiment. During time interval, t2, the initial phase of the enumeration process occurs, and the chargeable power source is being discharged to supplement the specified low current limit from the USB bus when needed. Therefore, during t2, the USB device consumes only the specified amount (e.g., 100 mA) from the USB bus with any extra coming from the chargeable power source. Once the host device has sufficient information from the enumeration to recognize the USB device and its current and bandwidth requirements, etc., the host may issue a command that grants the USB device up to a specified high current limit (e.g., 500 mA) from the USB bus. At this point, the chargeable power source is no longer needed and the USB device may finish any portion of enumeration not completed and operate with the 500 mA for an indeterminate time period as illustrated by period t3 of block 135. It should be understood that the values of 100 mA and 500 mA are representative of limits in USB specifications at the time of the present application and may be any limit values within reasonable range of 100 mA and 500 mA as might be specified in any USB specification.

Figure 1B:
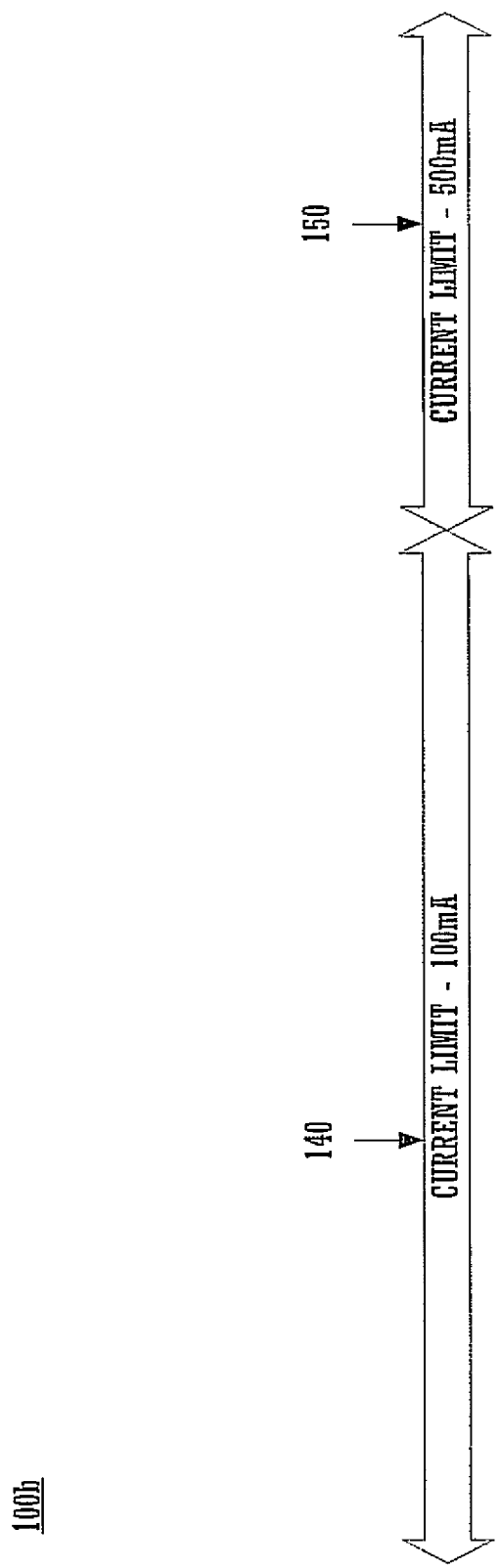
FIG. 1B is a block diagram of the specified current limits for a USB bus integrated with the block diagram of FIG. 1A, according to an embodiment of the present invention.

FIG. 1B is a block diagram 100b of the specified current limits for a USB bus integrated with the block diagram of FIG. 1A, according to an embodiment of the present invention. Block 140 represents the duration of the specified 100 mA current from the USB bus. According to one embodiment, the 100 mA current limit (from the USB bus) is in force throughout time intervals t1 and t2 of FIG. 1A. That is, the 100 mA is in force until the host device grants permission for the USB device to use up to 500 mA of current as illustrated, according to one aspect of the embodiments, by block 150 of FIG. 1B.

Figure 1C:
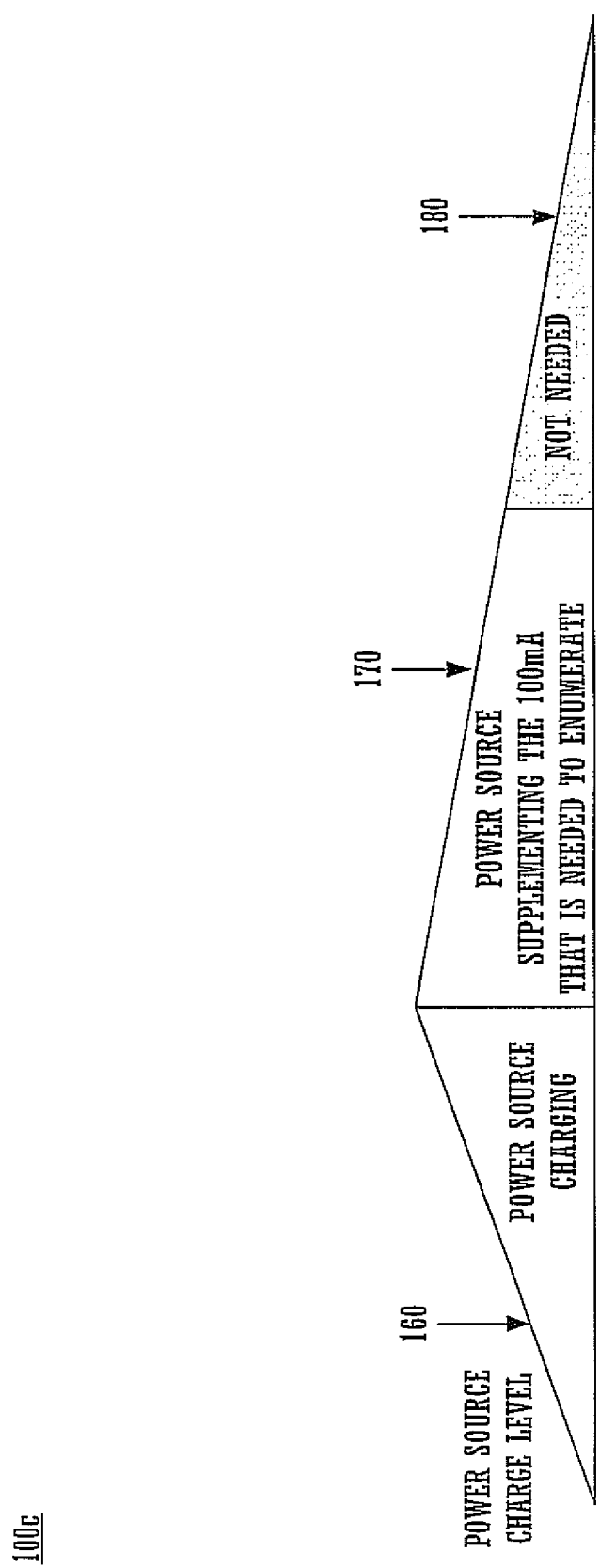
FIG. 1C is a block diagram of a method of supplementing USB current integrated with the block diagram of FIGS. 1A and 1B, according to an embodiment of the present invention.

FIG. 1C is a charging diagram 100c for supplementing USB current integrated with the diagrams of FIGS. 1A and 1B, according to an embodiment of the present invention. Block 160 illustrates the charging of a chargeable power source (e.g., a battery or capacitor) during time interval t1. It should be appreciated that if insufficient charge is accumulated over a first interval t1, that t1 may repeat over and over until such time as sufficient charge has accumulated at the chargeable power source.

Still referring to FIG. 1C, block 170 illustrates the discharging of power from the chargeable power source to supplement the 100 mA USB current for enumeration during time interval t2, according to one embodiment. At the beginning of interval t2, control logic (e.g., control logic 225 of FIG. 2) activates a pull-up resistor (e.g. 230 of FIG. 2) and switches (e.g., switches 240 and 235 of FIG. 2) are set to discharge (discharge=1) the power source for supplementing the 100 mA current. Thus, the USB device may be enumerated within the USB specifications.

Figure 2:
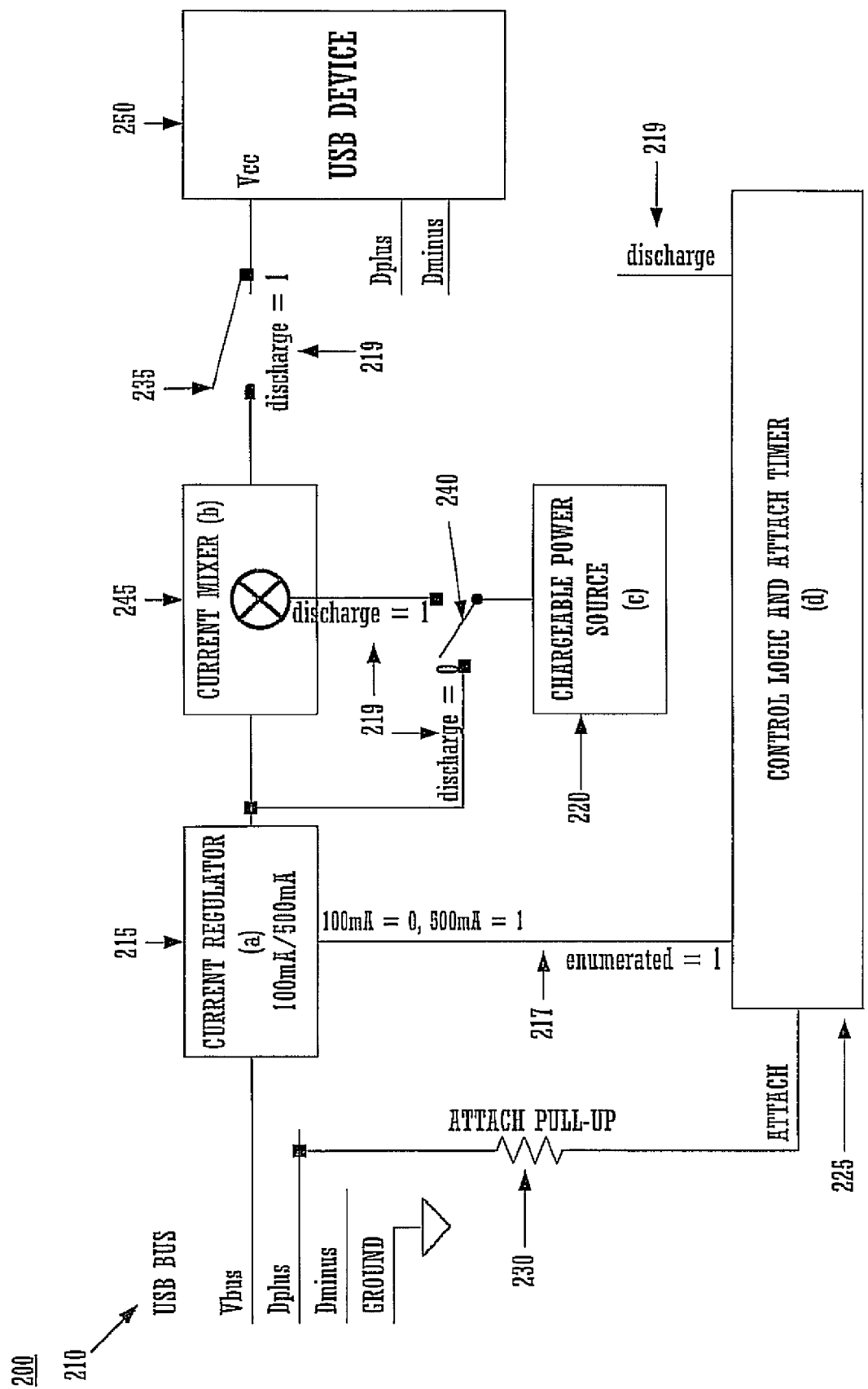
FIG. 2 is a block diagram of USB device enumeration architecture, according to one embodiment of the present invention.

FIG. 2 is a block diagram of USB device enumeration architecture 200 in accordance with an embodiment of the present invention. USB bus 210 is also shown. Device 200 includes current regulator 215, chargeable power source 220, control logic and attach timer 225 and attach pull-up resistor 230, according to one embodiment of the present invention. Also included in architecture 200, according to an embodiment of the present invention, are switches 235 and 240 (controlled by circuit 225), current mixer 245 and USB device 250. Architecture 200 may, in one embodiment, reside within USB device 250 or, according to another embodiment, architecture 200 may be made available as a separate power monitor or power maintenance chip coupled to the USB bus 210.

Still referring to FIG. 2, USB bus 210 may be a standard USB (Universal Serial Bus) bus that is well known to those skilled in the art. USB bus 210 is designed to connect a variety of peripheral devices to a host device. Bus 210 has four lines, a voltage v-bus line, two data lines (D+ and D−) and a ground line. The specification for USB bus 210 limits the current draw of a USB device (e.g., USB device 250) to a low limit (e.g., 100 mA) until such time as a host device (to which the USB device is attaching via USB bus 210) grants permission to increase the current draw to a maximum limit (e.g., 500 mA). USB device 250 will identify itself to the host device to receive an address, a driver and configuration with the host. This process of a device identifying itself to the host and becoming configured for the host is known as enumeration. High speed USB devices frequently need in excess of the specified low limit in order to be enumerated.

Current regulator 215 of FIG. 2 is a circuit designed to regulate the current from the v-bus line of USB 210 so as not to exceed the low limit (e.g., 100 mA) during the enumeration of device 250 until such time as a host (not shown) grants permission to increase the current to a high limit (e.g., 500 mA). Current regulator 215 then regulates the current to remain at or below the specified high limit. Regulator 215 receives a control signal 217 and during enumeration this signal limits regulator 215 to supply only 100 mA and, otherwise, it may supply 500 mA.

Still referring to FIG. 2, during the first time interval (t1 of FIG. 1A) when the USB device has first been plugged into the USB bus 210, control logic circuit 225 causes switch 240 to be set to discharge=0, attaching chargeable power source 220 to current regulator 215 and v-bus of USB 210. Signal 217 is low and 100 mA is regulated. Switch 235 remains open and the data lines of USB bus 210 are not pulled up so that USB device 250 is not attached to the circuit or the host during time interval t1. Control logic circuit 225 generates the charge/discharge signal 219 controlling the switched chargeable power source. During this time, as measured by circuit 225, chargeable power source 220 is drawing current from USB 210, as regulated by current regulator 215. Only 100 mA maximum may be drawn at this phase.

Control logic and attach timer 225 of FIG. 2 determine the end of time intervals t1 and t2, according to one embodiment. When t1 has ended, control logic and attach timer 225 sends a signal to attach pull-up resistor 230 that pulls up data line D-plus and causes switch 240 to change to the discharge=1 position. Switch 235 closes, thus, along with the D-plus line, attaching USB device 250 to the USB bus and to the host device. Signal 217 is still low. At this time, chargeable power source 220 is available to discharge current into current mixer 245 where the USB bus current can be supplemented and mixed with the discharged current from chargeable power source 220 for enumerating USB device 250.

In summary, during time interval t2 enumeration is occurring and the USB device may draw more power than 100 mA with the excess deriving from the chargeable power supply 220 and the 100 mA deriving from the USB bus 210.

At the end of time interval t2, when the host device has granted permission to USB device 250 to come aboard, control logic and attach timer 225 signals current regulator 215 to allow the v-bus of USB bus 210 to output up to the maximum high limit (e.g., 500 mA) current. At this time, in accordance with one embodiment, the USB device enumeration architecture has completed its task. At this time, signal 217 goes high, allowing 500 mA to be regulated by regulator 215.

The current regulator 215, current mixer 245, switches 235 and 240, chargeable power source 220 and control logic and attach timer 225 can be integrated within USB device 250 or they may be integrated within a separate power maintenance device or chip for connecting to the USB device. Control logic 225 may be implemented by a state machine.

Figure 3:
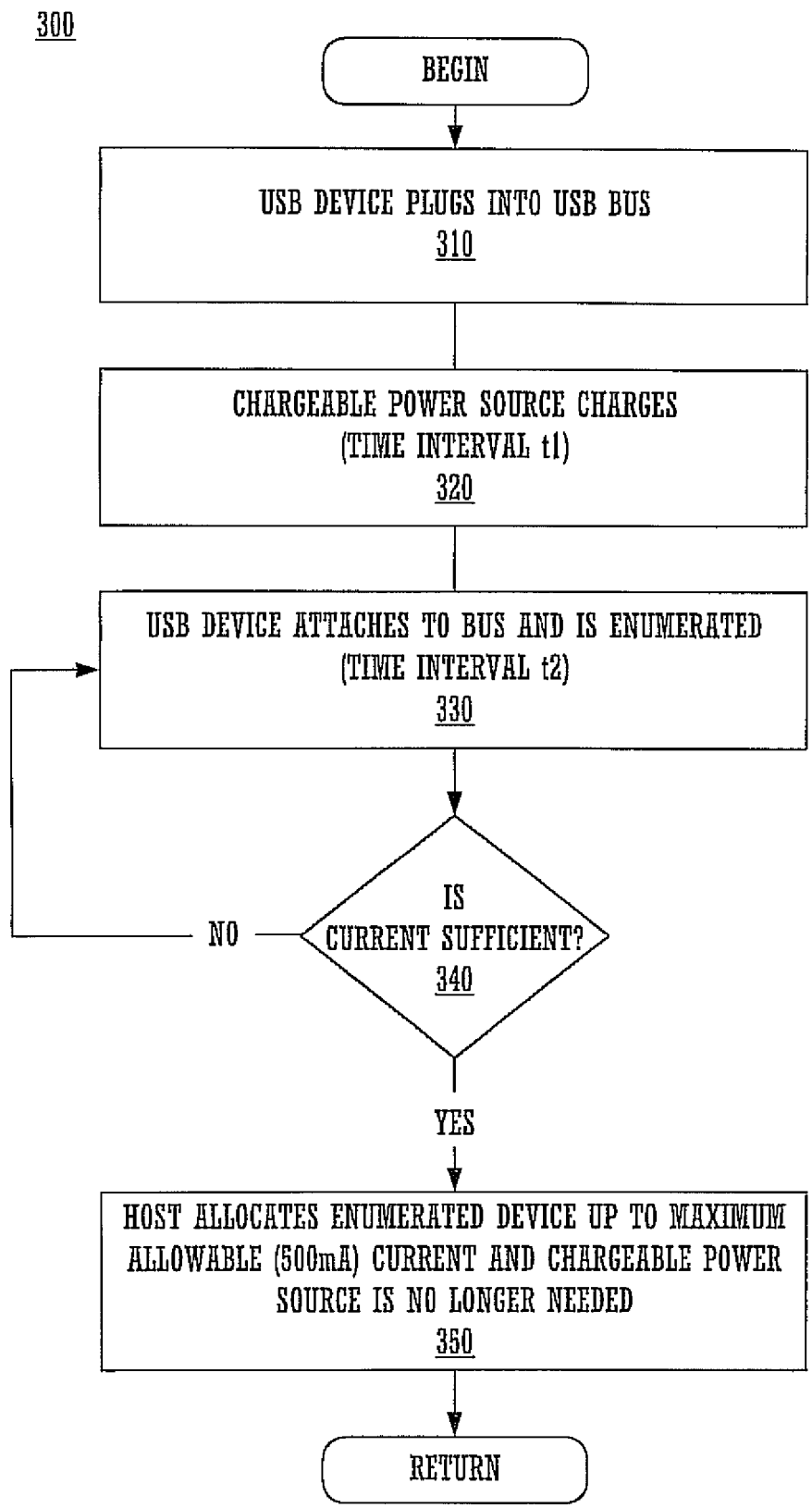
FIG. 3 is flow diagram of a method for augmenting current for enumerating a high speed USB device in accordance with one embodiment of the present invention.

FIG. 3 is flow diagram 300 of a process for augmenting current for enumerating a high speed USB device in accordance with one embodiment of the present invention. Although specific steps are disclosed in flow diagram 300, such steps are exemplary. That is, the present invention is well suited to performing various other steps or variations of the steps recited in FIG. 3.

At step 310 of FIG. 3. A USB device (e.g., USB device 250 of FIG. 2) is plugged into a USB bus (e.g., USB bus 210 of FIG. 2). During a first time interval t1 after the USB device has been plugged into the USB bus, USB device 250 is not attached to the circuit or the host.

At step 320 of FIG. 3, a chargeable power source (e.g., chargeable power source 220 of FIG. 2) is drawing current from USB bus 210, over a time interval t1. At the end of time interval t1, step 330 is entered and USB device 250 is attached to the host device through USB bus 210 and enumeration architecture 200 and enumeration is begun in accordance with one aspect of the embodiments, provided there is sufficient current available. If there is insufficient current at any point during step 330, step 340 of process is entered and the process returns to step 320 for further charging of the chargeable power source. This step may be repeated as often as necessary until step 350 may be entered.

At step 350, according to one embodiment, the host device has completed the initial enumeration process and allocates the USB device permission for the higher USB current limit so that it may be fully attached. At this point the chargeable power source and the USB enumeration architecture are no longer needed and the process exits flow diagram 300.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of supplying current to a device, the method comprising:
   in response to coupling the device to a peripheral bus, supplying a first current to the device from the peripheral bus; and
   in response to initialization of enumeration of the device and without regard to whether a current draw by the device exceeds a current low limit, supplying additional current to the device to enable enumeration of the device, wherein the supplying a first current and the supplying additional current are performed simultaneously, and wherein the additional current is supplied from a power source, and wherein further the power source is separated from a source of the first current.

2. The method of claim 1, wherein the peripheral bus comprises a substantially-compliant USB bus, wherein the device comprises a USB device, and wherein the first current is approximately 100 milliamps.

3. The method of claim 1 further comprising:
   charging the power source prior to the supplying of the additional current;
   coupling the power source to the peripheral bus; and
   discharging the power source to supply the additional current to the device.

4. The method of claim 1 further comprising:
   supplying an enhanced current to the device after enumeration thereof, wherein the enhanced current exceeds the first current, and wherein the enhanced current is supplied to the device over the peripheral bus.

5. The method of claim 4, wherein the enhanced current is approximately 500 milliamps.

6. The method of claim 1, wherein the device is selected from a group consisting of a printer, a scanner, a hard disk drive, a digital camera, and a portable electronic device.

7. A current supply component comprising:
   a bus for coupling to a device, wherein the bus is configured to supply a first current to the device prior to enumeration of the device;
   a chargeable power source coupled to the bus; and
   control logic coupled to the bus and configured to enable charging of the chargeable power source, the control logic further configured to, in response to initialization of enumeration of the device and without regard to whether a current draw by the device exceeds a current low limit, enable the supply of an additional current to the device by discharging the chargeable power source, the additional current for enabling enumeration of the device, the control logic further configured to enable the supply of the additional current simultaneously with the supply of the first current.

8. The current supply component of claim 7, wherein the control logic is further operable to enable charging of the chargeable power source by initiating coupling of the chargeable power supply to the bus.

9. The current supply component of claim 7, wherein the control logic is further operable to enable supply of the additional current by enabling the coupling of the chargeable power supply to the bus and further enabling the supply of the additional current over the bus to the device.

10. The current supply component of claim 7 further comprising:
   a current mixer coupled to the bus and for directing current from the bus to the chargeable power source to charge the chargeable power source, the current mixer further for directing the additional current from the chargeable power source to the bus to discharge the chargeable power source and supplement the first current supplied to the device via the bus.

11. The current supply component of claim 7, wherein the device is selected from a group consisting of a printer, a scanner, a hard disk drive, a digital camera, and a portable electronic device.

12. The current supply component of claim 7, wherein the bus and the control logic each comprise components of a power maintenance integrated circuit.

13. A system comprising:
   a computer system;
   a device coupled to the computer system; and
   a current supply component coupled to the computer system and the device, the current supply component comprising:
      a bus coupled to the device and configured to supply a first current to the device prior to enumeration of the device;
      a chargeable power source coupled to the bus; and
      control logic coupled to the bus and configured to enable charging of the chargeable power source, the control logic further configured to, in response to the enumeration, enable the supply of an additional current to the device by discharging the chargeable power source, the additional current for enabling initialization of enumeration of the device and without regard to whether a current draw by the device exceeds a current low limit, the control logic further configured to enable supply of the additional current simultaneously with supply of the first current.

14. The system of claim 13, wherein the control logic is further operable to enable charging of the chargeable power source by initiating coupling of the chargeable power supply to the bus.

15. The system of claim 13, wherein the control logic is further operable to enable supply of the additional current by enabling the coupling of the chargeable power supply to the bus and further enabling the supply of the additional current over the bus to the device.

16. The system of claim 13 further comprising:
   a current mixer coupled to the bus and for directing current from the bus to the chargeable power source to charge the chargeable power source, the current mixer further for directing the additional current from the chargeable power source to the bus to discharge the chargeable power source and supplement the first current supplied to the device via the bus.

17. The system of claim 13, wherein the device is selected from a group consisting of a printer, a scanner, a hard disk drive, a digital camera, and a portable electronic device.

18. The system of claim 13, wherein the bus and the control logic each comprise components of a power maintenance integrated circuit.

19. The system of claim 13, wherein the current supply component is disposed within a component selected from the computer system and the device.

\* \* \* \* \*